United States Patent [19]

Wetzels et al.

[11] 3,999,455

[45] Dec. 28, 1976

[54] METHOD AND APPARATUS FOR CONTROLLING WITH INCREASED ACCURACY A PROCESSING MACHINE DRIVEN AT VARYING OPERATING SPEEDS, SUCH AS A SLIDE DRAWING MACHINE, ESPECIALLY, AS WELL AS THE SLIDE DRAWING MACHINE PER SE AND AUXILIARY DEVICES

[75] Inventors: Walter Wetzels, Eynatten, Belgium; Johann Greven; Wilhelm Römer, both of Aachen-Schleckheim, Germany; Heinz Hoppe, Aachen, Germany

[73] Assignee: Schumag Schumacher Metallwerke Gesellschaft mit beschrankter Haftung, Aachen, Germany

[22] Filed: Nov. 3, 1975

[21] Appl. No.: 628,101

Related U.S. Application Data

[62] Division of Ser. No. 465,620, April 30, 1974, Pat. No. 3,943,743.

[30] Foreign Application Priority Data

| | | |
|---|---|---|
| May 3, 1973 | Germany | 2322279 |
| Nov. 9, 1973 | Germany | 2356046 |
| Jan. 28, 1974 | Germany | 2403872 |

[52] U.S. Cl. .................................................. 83/320

[51] Int. Cl.$^2$ ...................... B23D 25/04; B26D 1/56

[58] Field of Search ............. 72/290, 422; 226/112, 226/163, 164; 83/318–320

[56] References Cited

UNITED STATES PATENTS

| | | | |
|---|---|---|---|
| 3,211,037 | 10/1965 | Drolot | 83/320 |
| 3,859,881 | 1/1975 | Hawley et al. | 83/320 |

*Primary Examiner*—Milton S. Mehr
*Attorney, Agent, or Firm*—Herbert L. Lerner

[57] ABSTRACT

Method of controlling with heightened accuracy a processing machine driven at different operating speeds and having a machine part moving through a predetermined full range, the processing machine, at an initial setting of the moving machine part, within a given tolerance range, repeatedly permitting start-up of a processing cycle that has been instituted in advance through a precontrolled time period dependent upon the operating speed and which includes a control commencement build-up time period and a full range displacement time period, which includes interposing a blocking time period between the control commencement build-up time period and the full range displacement time period, the blocking time period always ending at the same position in the displacement range of the moving machine part, blocking the full range displacement by the moving machine part until the end of the blocking time period, and advancing the start of the control commencement build-up time period in accordance with the blocking time period; apparatus for performing the foregoing method; a processing machine in the form of a slide drawing machine per se; and auxiliary devices for the slide drawing machine.

15 Claims, 25 Drawing Figures

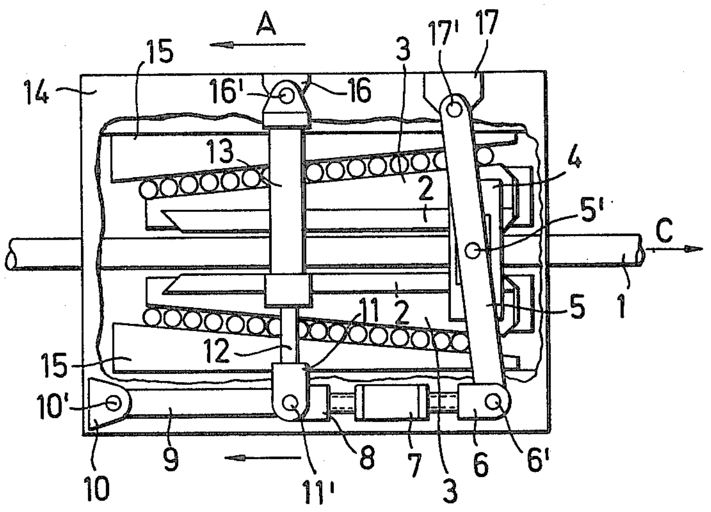
FIG. 1
FIG. 2
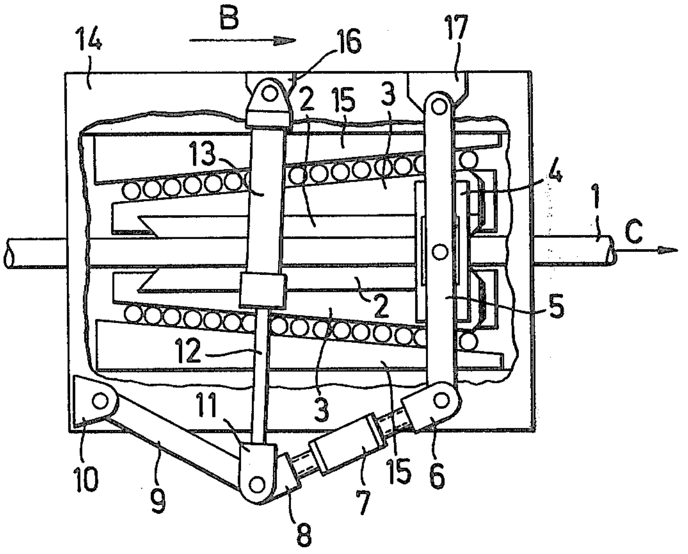

METHOD AND APPARATUS FOR CONTROLLING WITH INCREASED ACCURACY A PROCESSING MACHINE DRIVEN AT VARYING OPERATING SPEEDS, SUCH AS A SLIDE DRAWING MACHINE, ESPECIALLY, AS WELL AS THE SLIDE DRAWING MACHINE PER SE AND AUXILIARY DEVICES

This is a division, of application Ser. No. 465,620,filed Apr. 30, 1974, now U.S. Pat. No. 3,743,743.

The invention relates to a method and apparatus for controlling with heightened accuracy a processing machine driven at varying operating speeds, such as a slide drawing machine, especially, as well as the slide drawing machine per se and the auxiliary devices. The processing machine to which reference has been made is quite generally a machine in which a workpiece is advanced at an operating speed that is constant for the particular operation yet can be varied selectively from operation to operation, moreover, a machine part or tool is provided which can be moved toward the workpiece transversely to the operating direction. This tool may be, for example, a saw or shears or, in the case of the slide or carriage drawing machine, the drawing jaws for gripping a strand-shaped elongated workpiece. In the specific case of the slide drawing machine, the invention relates particularly to a continuously operating slide drawing machine having at least two alternatingly operating slides that are reciprocatingly guided on rails extending parallel to the operating direction of the machine, and that further have associated rotating cam carriers for the slide drive system, openable and closable drawing jaws on each carriage, with a control device for controlled actuation of the drawing jaws each time within an overlap distance or span traversed by a slide during transfer of the workpiece from one slide to the other, and with a phase displacement of the cam profiles or tracks or the cam carriers associated with respective slides, which produces, within the overlap span or distance, the difference in the velocities of the slides that is necessary for the transfer of the workpiece.

In a processing machine according to one of the aforedescribed types, the operation of interest herein is quite generally that, at an initial position of a moving machine part, within a given tolerance range, the machine always permits an operation or processing cycle to start which is initiated in advance through a precontrolled time period dependent upon the operating speed and which includes a control commencement build-up time period and a full range displacement time period. This time period can also be called reaction duration time period.

The initial position is the position wherein, for example, in the case of a saw, the saw first comes into contact with the material to be sawed or, in the case of the slide drawing machine, the drawing jaws of the respective drawing slide have closed, grip the workpiece firmly, and the transmission of the drawing forces from this slide to the workpiece begins. The control commencement build-up time is the time which elapses, for example, in the case of a drawing-jaw control through subjection to a pressure medium, from the instant of starting to the instant of completion of the build-up of the control pressure in a control cylinder having a control piston. The full range displacement time is then the time required for the control piston to complete its operating stroke.

It has been known heretofore to effect the start by means of a trip dog or start-up cam rotating in synchronism with the machine. For different operating speeds, several trip dogs or start-up cams can be provided. The trip dog or start-up cam may also be adjustable. The adjustment can be effected automatically through the interposition of a tachogenerator. A control has also become known heretofore from German Pat. No. 1,930,700 wherein an adjustment is made automatically and continuously, depending upon the respective operating speed. All of the heretofore known measures based upon this known control have the disadvantage that, for example in the aforedescribed slide drawing machine with the drawing-jaw control through subjection to a pressure medium, that they work with sufficient accuracy only at operating speeds of up to about 60 m/min. At higher operating speeds of up to about 120 m/min., the accuracy is degraded considerably by the spread of the reaction delay time. Particularly the relatively long control commencement build-up time, which may be, for example, about 120 ms (milliseconds), is a source of inaccuracies here. The full range displacement time is usually shorter and is, in general, of the order of about 10 ms.

The overlap time necessary for traversing the overlap distance is also only of the order of about 10 ms for high operating speeds. These inaccuracies, particularly inasmuch as they result from the longer control commencement build-up time, can no longer be tolerated here. The inaccuracies cause a jerky transfer of the workpiece from one slide to the other. This results in the formation of undesirable surface marks on the workpiece and in increased wear of the guiding components of the drawing machine. It must also be taken into consideration, in that regard, that at high operating speeds the slides and the parts mounted thereon are subjected additionally to marked inertial forces when displacement or motion irregularities occur.

It is accordingly an object of the invention to increase the accuracy obtained when working with the heretofore known methods, devices or processing machines, particularly slide drawing machines, so that trouble-free operation is possible also at high operating speeds. In particular, it is an object of the invention to improve, in slide drawing machines, the accuracy in the transfer of the workpiece from one slide to the other and the constancy of the workpiece velocity during the transfer.

With the foregoing and other objects in view, there is provided, in accordance with the invention, a method of controlling with heightened accuracy a processing machine driven at different operating speeds and having a machine part moving through a predetermined full range, the processing machine, at an initial setting of the moving machine part, within a given tolerance range, repeatedly permitting start-up of a processing cycle that has been instituted in advance through a precontrolled time period dependent upon the operating speed and which includes a control commencement build-up time period and a full range displacement time period, which comprises interposing a blocking time period between the control commencement build-up time period and the full range displacement time period, the blocking time period always ending at the same position in the displacement range of the moving machine part, blocking the full range displacement by the moving machine part until the end of the blocking time period, and advancing the start of the control commencement build-up time period in accordance with the blocking time period.

Due to the fact that the blocking interval ends each time in the same position within the displacement range of the moving machine part, the full range displacement time, also always begins with this same position of the moving machine part. The spreading of the length of the relatively long control commencement build-up time is eliminated in this manner. Spreading of the very much shorter full range displacement time is accordingly much less noticeable. In this way the tolerance range for the initial position, in which the moving machine part permits the processing cycle to start, can be placed with sufficient accuracy within the overlap distance, in which the slides acquire the difference in their velocities which is necessary for the transfer of the workpiece. The advancing of the start of the control commencement build-up time does not require great accuracy. A minimum advance is sufficient. A greater advancement automatically results in a longer blocking time, since the end of the blocking time is fixed. The full range displacement time can be considered, in a first approximation, as being independent of the operating speed. This means that the initial position, wherein the moving machine part permits the processing cycle to start, is at a greater distance from the full range displacement position at higher operating speeds than at low operating speeds. The difference between these distances yields approximately the aforementioned tolerance range, which should lie within the aforementioned overlap distance for proper operation of the slide drawing machine. The method according to the invention provides an improvement over the aforedescribed heretofore known methods, increasing their accuracy and making them usable also at higher operating speeds.

In accordance with another feature of the method of the invention, a part of the full range displacement of the moving machine part is effected during the blocking time period until shortly before a workpiece is engaged for processing by the machine so as to leave only a residual distance for completing the full range displacement of the moving machine part.

In this mode of the method the full range displacement time is divided into two parts, the first of which elapses within the blocking time, and only the residual second part follows the blocking time. This residual second part is then the shortened effective full range displacement time. In this manner, the accuracy of the control is further increased. In particular, the tolerance range is decreased.

In accordance with another aspect of the invention, there is provided an apparatus for performing the method of controlling with heightened accuracy a processing machine driven at different operating speeds which, at an initial setting of a moving part thereof, within a tolerance range, repeatedly permits start-up of a processing cycle that has been instituted in advance through a given reaction delay time period wherein the moving machine part is a working member of the machine, and comprising track means for guiding the working member, control means for instituting actuation of the machine part at a position thereof wherein the actuation thereof is institutable; and blocking means engageable with the moving machine part for inhibiting full range displacement of the machine part that would otherwise result from the institution of the actuation thereof, the blocking means being active for inhibiting the full range displacement along a section of the track means up to a given position of the moving machine part within the displacement range thereof.

As will be seen, the method according to the invention can be carried out by relatively simple means, despite its great accuracy.

In accordance with another feature of the apparatus according to the invention, the blocking means comprises a blocking bar which extends along the respective section of the track means.

The blocking bar can be constructed or disposed also in a manner that renders possible the realization of the aforedescribed additional mode of the method of the invention according to which part of the full range displacement of the moving machine part takes place during the blocking time. At the end of the blocking bar only a residual part of the full range displacement then takes place in a shortened time period with accordingly increased accuracy.

The blocking bar can advantageously end substantially at the beginning of the overlap distance. It may also be slightly adjustable in lengthwise direction of the slide track means. The adjustability has the advantage that a particularly good match of the tolerance range for the initial position to the overlap distance can be made with a machine which operates mainly at predetermined operating speeds.

In accordance with other features of the invention, the processing machine is a slide drawing machine wherein the track means extend parallel to the operating direction of the machine and wherein two alternatingly operating slides are reciprocatingly movable on the track means, and includes rotating cam carrier associated with the slides for driving the same, and openable and closable drawing jaw means on each of the slides, the control means controllably actuating the drawing jaws repeatedly within an overlap distance traversable by one of the slides during transfer of a workpiece from one to the other of the slides, and displacing the phase of cam tracks on the cam carriers which produces, within the overlap distance, a difference in velocity of the slides that is necessary for effecting transfer of the workpiece. It has been known heretofore to attain a difference in the velocities of the slides by letting the pulling slide decelerate following the overlap distances, so that when the other slide has reached normal operating speed, the other slide takes over the drawing. It has been found that the desired maintenance of constant workpiece velocity is not fully achieved during the transfer. Even with very accurate control of the drawing jaws, the transfer often takes place without being able to avoid jerky motions. Consequently, in accordance with an additional feature of the invention and in order to avoid the foregoing disadvantage, the cam profiles or cam tracks in a starting region of a work stroke portion of the slide drawing machine located within the overlap distance have a steeper slope than in the remaining region of the work stroke portion. Further, in accordance with the invention, the slope of the cam tracks in the starting region is advantageously about 1 to 5%, and more particularly 2 to 3% steeper than in the remaining region. The slide to which the material is transferred thus receives, for a short distance or for a short time, a slight additional acceleration which can be adjusted just so that, together with the correctly adjusted drawing jaw control, a very uniform movement of the workpiece, virtually free of any jerks, is attained also during the transfer of the workpiece from one slide to the other.

In accordance with yet another embodiment of the invention, the processing machine is a slide drawing machine wherein the track means extend parallel to the operating direction of the machine and wherein at least one slide is reciprocatingly movable on the track means; a rotating cam carrier associated with the slide for driving the same, drawing jaw means on the slide openable and closable in direction transverse to the operating direction of the machine, locking wedge means connected to the drawing jaw means and displaceable in direction parallel to the operating direction of the machine, and control means controllably displacing the locking wedge means between a released and a clamped position thereof.

The foregoing describes a generally known type of construction of a slide drawing machine. The control of the drawing jaws described hereinabove, by which the workpiece velocity is maintained constant during transfer of the workpiece from one slide to the other, requires, for good control accuracy, an exact follow-up movement of the drawing jaws, dependent upon the control movements. This is difficult in the heretofore known machines when they are supposed to operate at high operating speeds of up to about 120 m/min, because considerable inertial forces occur at such high speeds, which disturb the exactness of the follow-up movement of the drawing jaws. In fact, the drawing jaws can be opened and closed in direction transversely to the operating direction in these known machines. Acceleration and deceleration forces therefore do not act directly on the drawing jaws. However, because of the large drawing forces required in a very large slide drawing machine, the drawing jaws are not actuated directly by the control means, but rather, locking wedges movable parallel to the operating direction are interposed, which, due to their wedging action, press the drawing jaws against the workpiece with very great forces during the drawing. The control means, therefore, bring about only an initial pressure application of the drawing jaws against the workpiece, while the final pressure is exerted in a self-locking manner by the wedging action of the locking wedges. Since the locking wedges are shiftable or displaceable parallel to the operating direction, they are subjected during the acceleration and deceleration to marked inertial forces, which, depending upon the position of the cam carrier, either oppose or reinforce the control force of the control means. In the case of the former, delayed actuation of the drawing jaws can result, and in the case of the latter, premature actuation can result. At the very least, inaccuracies in transmission of the motion are produced in this way, and have an unfavorable effect at high operating speeds. To this should be added that, in the heretofore known slide drawing machines, also the control means, which are constructed, for example, as a pressure medium-responsive or actuated cylinder with a piston and a piston rod, have a direction of action or operation in the displacement direction of the locking wedges, so that the large inertial forces mentioned also act on these control means.

To correct these shortcomings, in accordance with a further embodiment of the hereinabove described invention, control means are provided which have a direction of action transverse to the direction of operation of the machine, deflecting members are interposed between the control means and the locking wedge, means are provided for blocking movement of the locking wedge means, from situation to situation, in accordance with the respective position of the movement blocking means.

The effect of the inertial forces is thereby largely eliminated.

In accordance with other features of the invention, the control means comprise a pressure medium-responsive member including a cylinder, a piston displaceable in the cylinder and having a piston rod extending transversely to the operating direction of the machine, one end of the pressure medium-responsive member being pivotally secured to the slide, the deflection members being comprised of a toggle lever linkage having a first toggle lever pivotally secured at an outer end thereof to a fixed bearing location on the slide and a second toggle lever having an outer end force-lockingly connected through an articulating joint with the locking wedge means, the first and second toggle levers having a common toggle joint articulatingly linked to the other end of the pressure medium-responsive member, both of the toggle levers, in released position of the locking wedge means, extending stretched out and substantially parallel to the operating direction of the machine.

With the foregoing embodiment of the invention, the inertial forces can be rendered completely ineffective. This inventive construction also has the advantage that it is particularly well suited for cooperation with the aforedescribed blocking bar described, by which the full-range displacement is prevented during the blocking time period.

Another kind of blocking member according to the invention, comprises an end stop associated with the track means, and a locking lever which is associated with the moving machine part and movable in the direction of the track means the locking lever being held by the end stop in a position blocking full range displacement of the moving machine part. Since the occurring forces lie in the direction of the track means when the locking lever and the end stop interact, shocks or jerks, as with the blocking bar, cannot occur. Also, the end stop and the locking lever are structurally very simple to produce.

In accordance with a further feature of the invention, there is provided a pressure medium-responsive member having a cylinder, a piston displaceable in the cylinder and a piston rod at the moving machine part, the locking lever is mechanically connected by an articulating joint with the piston rod and, in the blocking position, permits at most only a partial stroke without full range displacement of the pressure medium-responsive member.

In accordance with another feature of the invention, the pressure medium-responsive member is operable in direction of the track means, the locking lever is articulatingly connected to the moving machine part and extends transversely to the direction of the track means to within effective range of the end stop, and the free end of the piston rod is articulatingly connected to the locking lever.

In accordance with an added feature of the invention, the locking lever extends on both sides from the moving machine part in direction transverse to that of the track means, and includes two end stops associated with the track means and cooperating with the two ends, respectively, of the locking lever. In both of the preceding additional features of the invention, the locking lever may inventively also be yieldably resilient, in order to extend the blocking range.

In accordance with a concomitant feature of the invention, deflection means are provided that comprise a toggle lever linkage having a first toggle lever pivotally secured at an outer end thereof to a fixed bearing location on the slide and a second toggle lever having an outer end force-lockingly connected through an articulating joint with linkage means connected to the slide, the first and second toggle levers having a common toggle joint, the pressure medium-responsive member being operable in direction transverse to the track means, the piston rod being articulatingly connected to the common toggle joint, the first toggle lever being constructed as a bellcrank and having a free arm forming the locking lever.

In accordance with other features of the invention, the locking lever is formed as a cam on the first toggle lever and has a surface displaceable in direction of the track means to cooperate with the end stop. The second toggle lever is adjustable in length, and the end stop is adjustable in position so that adjustment with respect to the operating accuracy is possible.

The hereinafter described construction relates to a temporary additionally attached severing device. Synchronization of the entrainment thereof in conformity with the operating speed is difficult. Formerly, the temporary severing device was coupled, for this purpose, firmly with the workpiece. This led, however, to the difficulty that the large inertial or acceleration forces occurring during the coupling because of the weight of the severing device caused damage to the workpiece. A relatively lighter auxiliary slide, had therefore already been mounted on a main slide, and carried the severing tool. However, with such a construction also, such great forces had to be transferred from the workpiece, that the workpiece was damaged in the process. Furthermore, with this heretofore known device, accurate positioning of the starting end of the workpiece was not possible, so that the severed lengths of the material were relatively largely different.

To avoid the last-mentioned disadvantages, there is provided in accordance with the invention, a continuously operating processing machine for processing strand-shaped material traveling in longitudinal direction of the material through the machine, including members acting on the material in a direction transverse to the longitudinal travel direction thereof and devices for controlling respective operating speed with heightened accuracy, comprising a severing device adapted to travel along with the traveling material for a predetermined distance and actuable to sever given lengths of the material, the severing device comprising a lower and an upper severing slide, track means, the lower severing slide being guidable on the track means parallel to the operating direction of the machine, the upper severing slide being guidable on the lower severing slide parallel to the operating direction, a severing tool carried by the upper severing slide, a main severing shaft continuously running in synchronism with a main operating shaft of the processing machine, controlled clutch means, drive cam means for displacing the lower severing slide back and forth, the displacement of the lower severing slide in the forth direction being in synchronism with the operating drive of the material, the main severing shaft being motion-lockingly couplable through the controlled clutch means with the drive cam means as the severing device travels along with the traveling material, and controlled positioning means for positioning the upper severing slide with respect to a starting end of the material prior to the severing operation.

In accordance with another feature of the inventive severing device, the positioning means comprise a controllable displacement member having one end thereof secured to the upper severing slide and another end thereof secured to the lower severing slide.

In accordance with yet another feature of the severing device invention, the controllable displacement member comprises a pressure medium-responsive cylinder, a piston displaceable in the cylinder and a piston rod.

In accordance with a further feature of the severing device of the invention, there is provided a distance or spacer rod secured at the upper severing slide and extending parallel to the operating travel direction of the material, control finger means mounted on the distance rod and serving to control the displacement member, the control finger means being adjustable in accordance with a predetermined length of the material to be severed, and means for actuating the control finger means from the starting end of the material.

In accordance with an added feature of the severing device of the invention, there is provided a lower frame, a release contact attached adjustably to the lower frame and located ahead of the control finger means in traveling direction of the material, the release contact being actuable by the starting end of the material, for effecting controlled, time-delayed engagement of the clutch means between the main severing shaft and the drive cam means.

In accordance with an additional feature of the invention, the severing device has a severing tool that is a cut-off knife blade, and further comprises a first lever holding the knife blade and pivotally mounted on the upper severing slide, the first lever extending substantially parallel to the operating travel direction of the material, a second lever in the form of a bellcrank pivotally mounted on the lower severing slide and cooperating with the first lever, the second lever having at one arm thereof roller means for transmitting severing force to the first lever substantially transversely to the operating travel direction, and with the other arm thereof projecting into the vicinity of the track means for guiding the lower severing slide so as to produce the severing force when moving past a contact roller carried by the track means.

It should also be noted with respect to the advantages of the invention, that severing devices having servomechanism controls are known. In these heretofore known devices, the severing location is already positioned with respect to the starting end of the material, so that accurate cutting to length can be achieved. However, the heretofore known devices of this general type are cumbersome and costly and not suited, particularly, for high material throughput rates because very long travel paths are required for the positioning. In contrast thereto, the severing device according to the invention of this application is reliably suited also for high speeds.

Other features which are considered as characteristic for the invention are set forth in the appended claims.

Although the invention is illustrated and described herein as embodied in a method and apparatus for controlling with increased accuracy a processing machine driven at varying operating speeds, such as a slide drawing machine, especially, as well as a slide drawing machine per se and auxiliary devices, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which;

FIG. 1 is a diagrammatic view partly broken away of a drawing slide constructed in accordance with the invention, the drawing slide being in a reversed stroke displacement phase i.e. opposite to the operating direction, and the position of the control members thereof being such that the drawing jaws are not in engagement with the material being drawn, leaving clearance for non-engaging passage of the material;

FIG. 2 is a view similar to FIG. 1 of the drawing slide of the invention shown in a phase wherein it is moving in the drawing direction i.e. together with the material in the operating direction, the control members being positioned so that the drawing jaws have gripped the material and are executing a drawing stroke;

Figure 3:
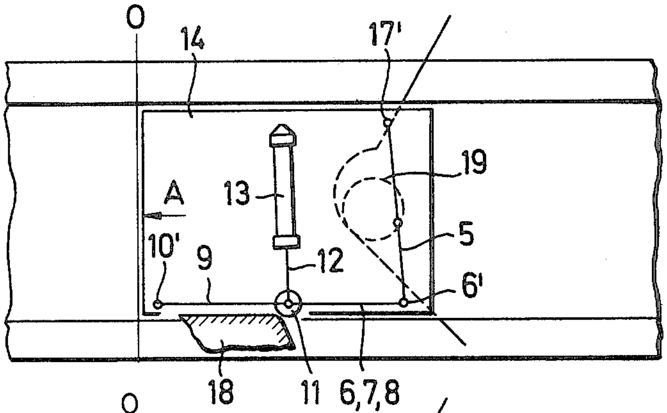
FIGS. 3 to 6 are diagrammatic views of the drawing slide on a smaller scale than in FIGS. 1 and 2, showing individual control phases thereof with respect to the position and direction of displacement of the drawing slide.

Referring now to the drawing and first, particularly, to FIG. 1 thereof, there is shown a drawing slide constructed in accordance with the invention and in a phase of operation thereof wherein a toggle lever 6–9 is stretched straight out, and control members 11–13, drawing jaws 2 and movable wedges 3 are held rigid. The drawing slide is shown moving in direction of the arrow A, opposite to the direction of movement of the material 1 to be processed, as indicated by the arrow C.

In FIG. 1, a control cylinder 13 has pulled a piston rod 12 and a bearing yoke 11 by which it is secured to the toggle lever formed of conventional parts 6, 7 and 3 on the one side and of a part 9 on the other side, are stretched out straight. A bearing yoke 10 is firmly mounted on a drawing slide housing 14. The toggle lever arm 9 bears against the bearing yoke 10 through the pivot pin 10′. The bearing yoke 11 is connected with the toggle lever arms 9 and 8, 7, 6 through a pivot pin 11′. The toggle lever arm 6, 7, 8 which has an adjustable length, holds a lever 5 in swung-out position by means of a pivot pin 6′. The lever 5 is pivotally mounted at a bearing yoke 17 by means of a pin 17′. The bearing yoke 17 is firmly supported on the drawing slide housing 14. The control cylinder 13 is pivotally secured in a bearing yoke 16 by a pin 16′, and the bearing yoke 16 is, in turn, mounted firmly on the drawing slide housing 14. Parts that are reciprocable in the drawing slide housing 14, such as the drawing jaws 2, the movable wedges 3 and an entrainer member 4 are held in rear position by the control linkage through a pivot pin 5′. The movable wedges 3 move parallel to the inclination of the wedges. They bear against fixed wedge members 15 in the drawing slide housing 14 through trains of rollers, as shown in FIG. 1. The drawing jaws 2 are rigidly connected to the movable wedges 3 and, accordingly, follow the movement of the wedges 3. In the rear position of the drawing jaws 2 and the movable wedges 3, an air gap exists between the drawing jaws 2 and the material 1 in order to avoid contact therebetween.

In FIG. 2 the toggle lever 6–9 is bent outwardly, and a clamping force is thereby exerted through the control linkages and the wedges 3 and drawing jaws 2 on the material 1. In the phase position of FIG. 2, the drawing slide moves in the direction of the arrow B together with the material 1 in the direction of the arrow C. The drawing stroke is thereby executed. The required compressive force of the drawing jaws 2 applied to the material 1 is produced automatically by the wedging action between the movable wedges 3 and the fixed wedge members 15. The drawing jaws 2 press against the material 1, gripping it with a strong compressive force, and pull it with the drawing slide in the drawing direction B. The control cylinder has driven the piston rod 12 and the bearing yoke 11 outwardly. The toggle lever arm 9 has swung about the pivot pin 10′ in the fixed bearing yoke 10. The other toggle lever arm 6, 7, 8 has swung about the pivot pin 6′. The pin 11′, which performs an arcuate movement, imparts a swinging motion about the pivot pin 16′ to the piston rod 12 and the control cylinder 13, so that the control cylinder 13, depending upon the adjustment of the control linkage, follows every movement. Through the bending of the toggle lever, the distance between the pin 10′ and the fixed bearing yoke 10, on the one hand, and the pin 6′, on the other hand, is shortened. The lever 5 pivots about the pin 17′ in the fixed bearing yoke 17, in a direction opposite to the direction of travel of the drawing slide shown by the arrow B, and thereby moves the entrainer member 4, the movable wedges 3 and the drawing jaws through the pin 5′ farther into the fixed wedge housing formed of the wedge pieces 15. Accordingly, the drawing jaws 2 are pressed against the material 1. The engagement surfaces of the drawing jaws 2 effect a longitudinal displacement opposed to the travel direction of the material 1, and simultaneously effect a displacement in traverse direction toward the material 1. Thus the control operation for closing the drawing jaws 2 is completed, and the drawing stroke can follow.

In FIGS. 3 to 6, the individual phase positions of the drawing slide during the control operation for closing the drawing jaws 2 are shown.

In FIG. 3, the drawing slide 14 moves in the direction of the arrow A with the drawing jaws open, as shown in FIG. 1. The bearing yoke 11 is retracted and the toggle lever 6–9 is in stretched-straight position. Shortly before the drawing slide reaches the reversal point i.e. just before it reaches the zero line, a control pulse is given to the control cylinder. Before the piston rod 12 together with the bearing yoke 11 is driven out of the control cylinder 13, a given time period elapses, a so-called control commencement build-up time. On the return path in direction A, the piston rod 12 with the bearing yoke 11 already extends outwardly somewhat, so that the bearing yoke 11 strikes against the parallel-disposed blocking bar 18 during the further return movement. As long as this blocking persists (blocking time), the piston rod 12 cannot be driven further outwardly. The pressure exerted on the piston within the control cylinder 13 therefore persists, although the piston is unable to complete the remainder of its stroke or travel path, i.e. full-range displacement.

Figure 4:
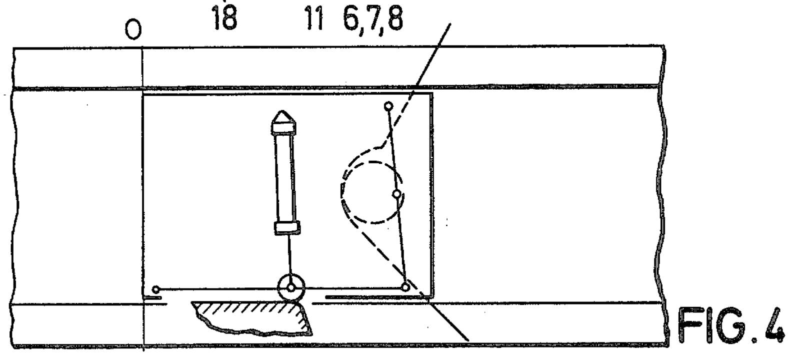

In FIG. 4 the drawing slide 14 has reached the reversal point. The leading edge of the drawing slide 14 is at the zero line. The bearing yoke 11 engages the parallel-extending blocking bar 18 under pressure. The control members cannot close the drawing jaws 2 as long as the bearing yoke 11 abuts the blocking bar 18.

Figure 5:
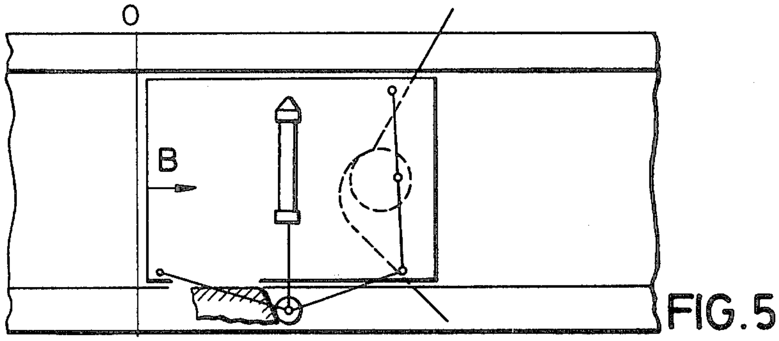

In FIG. 5, the drawing slide 14 moves away from the reversal point i.e. forward from the zero line in the direction of the arrow B. The drawing slide 14 is then being accelerated in the direction of the arrow B. The bearing yoke 11 presses against the parallel blocking bar 18 until the drawing slide reaches a position wherein the overlap section D in FIG. 7 begins. At that instant, the blocking ceases, and the remaining stroke or outward travel of the piston is resumed. The closing operation follows immediately, as shown in FIG. 2. Through this control operation, the time from switch-on to the application of pressure by the control cylinder i.e. the so-called control commencement build-up time, is rendered ineffective with respect to the control operation.

Figure 6:
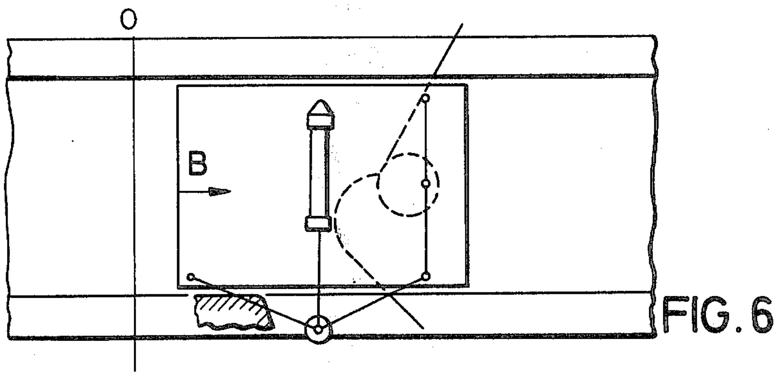
Figure 7:
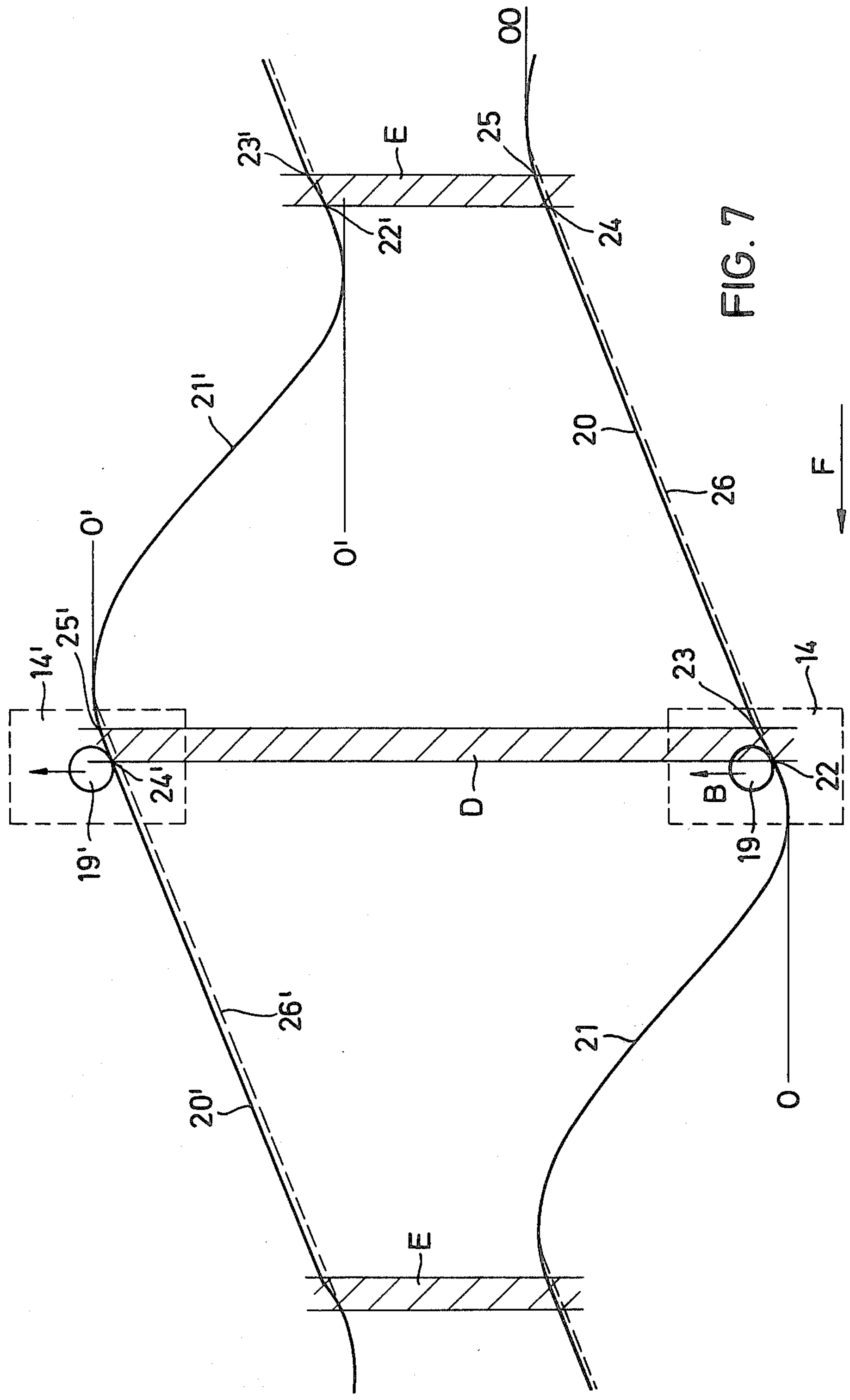
FIG. 7 is a plot diagram of the course or path of the cam profiles of the two drum-shaped cam carriers for the drawing slide with overlap sections.

In FIG. 6, the drawing slide 14 moves in the direction B and has already executed the drawing stroke (operating stroke). The overlap section D in FIG. 7 has thereby been passed through. In this section D, the drawing slide 14 takes over the material 1 from the slide 14'. After the drawing slide 14 has completed its drawing stroke, the control operation, as described hereinbefore with respect to the drawing slide 14', is carried out. The subsequent repeated closing operation for the drawing slide 14' occurs in the overlap section E (FIG. 7). Therein, the material 1 is again taken over by the drawing slide 14' from the drawing slide 14.

The track of the cam surface of the drum-shaped cam carrier is shown in FIG. 7. In order to produce a continuous material drawing speed, at least two drawing slides are necessary. Each drawing slide is reciprocated by its own drive cam drum. The movements of the two drawing slides must be matched exactly to each other. The cam paths or tracks 20 and 20' are the forward tracks for the work stroke (drawing stroke). The cam tracks 21 and 21' are return tracks. At the reversal points 0 and 0', the direction of movement of the drawing slides in the direction B begins for a new work stroke. From the reversal point 0, a roller 19 at the slide 14 is advanced in the direction of the arrow B, when the cam drum rotates in the direction of the arrow F. Upon reaching the point 22 on the curve, the drawing slide 14 has attained the drawing speed. Within the overlap section D from the point 22 to the point 23 of the cam track, the closing operation of the drawing jaws occurs. In this overlap section D between the two points 22 and 23, the drawing slide is given an additional acceleration of the forward motion, so that the velocity thereof is somewhat higher, about 2 to 3% higher, than the work or drawing velocity.

By increasing the forward velocity within the overlap range, as was determined by suitable testing, the closing of the drawing jaws and the securing wedging action in the wedge housing of the drawing slide occur without any reduction of the workpiece velocity. Heretofore, this closing operation for the securing wedging action in the wedge housing of the drawing slide was performed only at the end of the overlap section and, in fact, in such a manner that the forward velocity of the material-transferring drawing slide 14' was decelerated after it reached the point 25'. This resulted in a reduction in the drawing velocity of about 2 to 3%.

Figure 8:
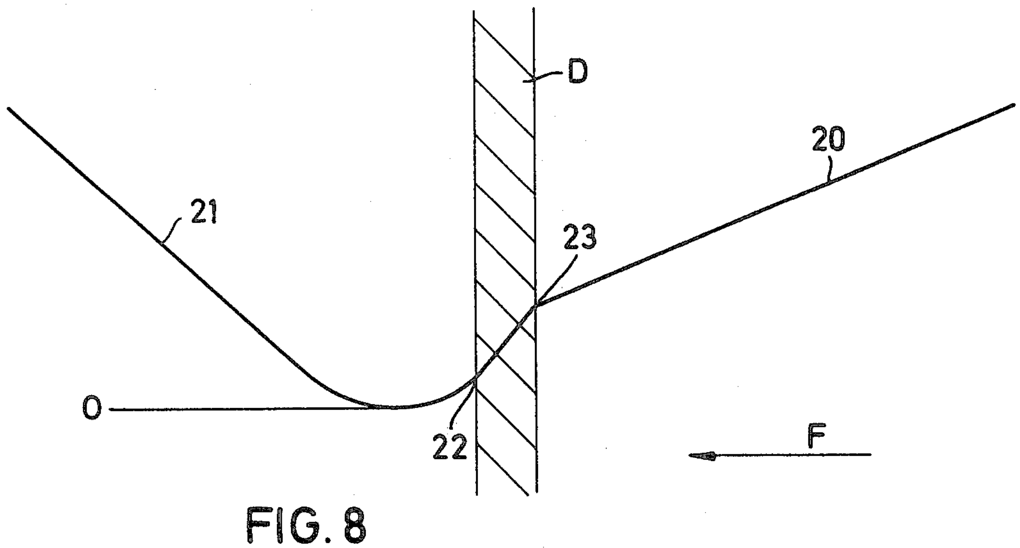
FIG. 8 is an enlarged fragmentary view of FIG. 7 showing a section of increased acceleration or velocity within one of the overlap sections.
Figure 9:
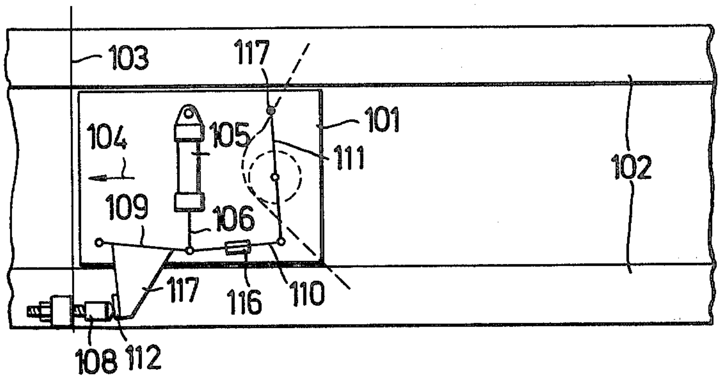
FIGS. 9 to 12 are diagrammatic views of another embodiment of the invention shown in various phases of operation.

In FIG. 8, the section of increased acceleration between the points 22 and 23 is shown in a somewhat exaggerated presentation.

FIGS. 9 to 12 show different operating positions of the drawing slide and the control device therefore. As viewed in FIG. 9, the slide 101 which is on slide tracks or rails 102 and has a direction of travel represented by an arrow 104 is located, at the instant shown in the figure, just ahead of the dead center point 103. At this instant, pressure medium can be admitted to the cylinder 105, but the piston rod 106 cannot yet be thrust outwardly, because a blocking lever 107 abuts an end stop 108. Blocking occurs through the toggle lever linkage 109, 110. The toggle lever linkage 109, 110 also serves to transmit the movement of the piston rod 106 to a linkage lever 111 pivoted at 117, through which the closing of the drawing jaws (not shown) is accomplished when the piston rod 106 is thrust outwardly. The length of the toggle lever 110 is adjustable by a connecting adjustment member 116, and the position of the end stop 108 is adjustable for its part in a conventional manner.

Figure 10:
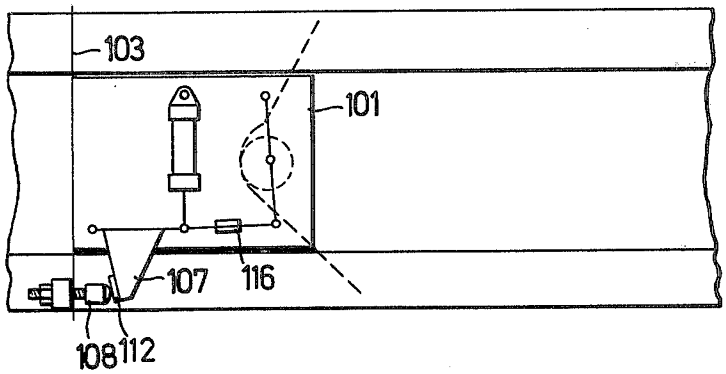

As shown in FIG. 10, the drawing slide 101 has reached dead center 103. The cylinder 105, acted upon by pressure medium, is blocked as in FIG. 9, with respect to extending or thrusting outwardly the piston rod 106. In the phase positions depicted in both FIGS. 9 and 10, the drawing jaws 2 (FIG. 1) are not yet closed.

Figure 11:
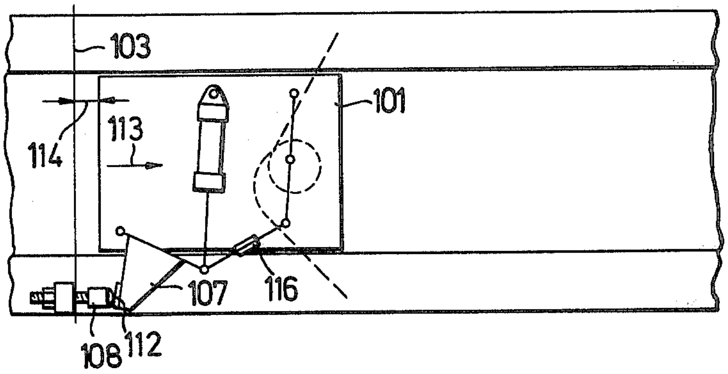

With respect to the phase illustrated in FIG. 11, the slide 101 has a travel direction as indicated by the arrow 113. The engaging surface 112 of the blocking lever 107 is beginning to lift from the end stop 108. The closing point of the drawing jaws is set at the spacing 114 of the slide 101 from the dead center 103 by suitably adjusting the adjustment member 116 of the toggle lever 110.

Figure 12:
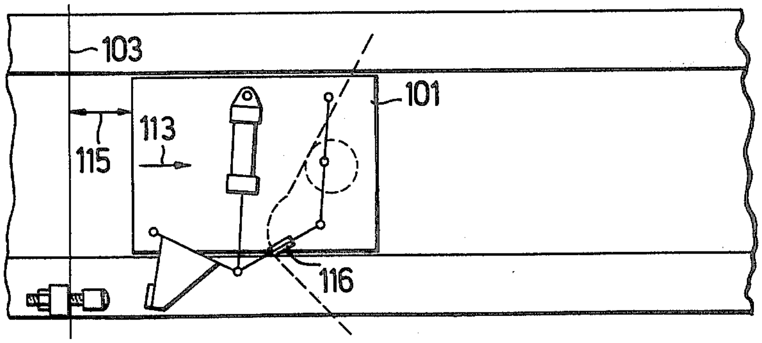
Figure 13:
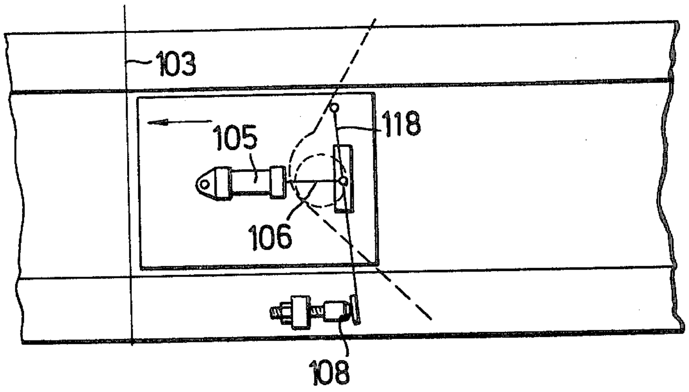
FIGS. 13 to 16 are diagrammatic views of yet another embodiment of the invention in different phases of operation.
Figure 14:
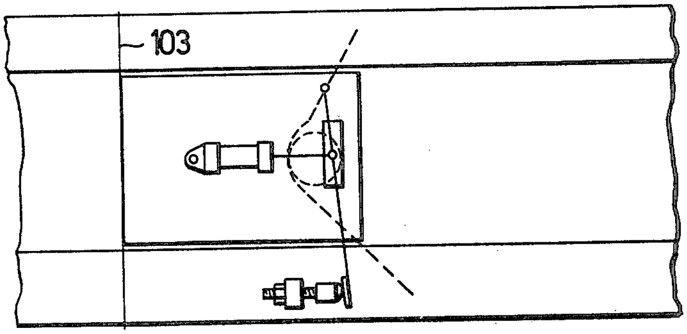
Figure 15:
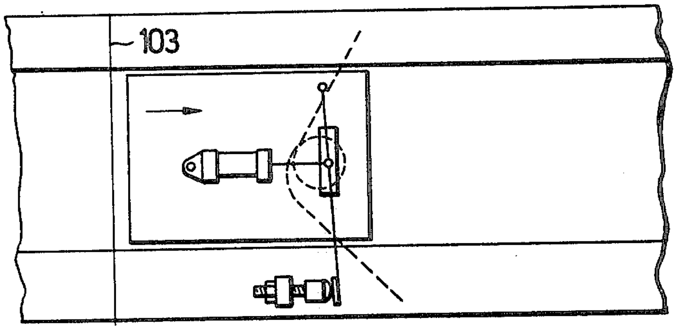
Figure 16:
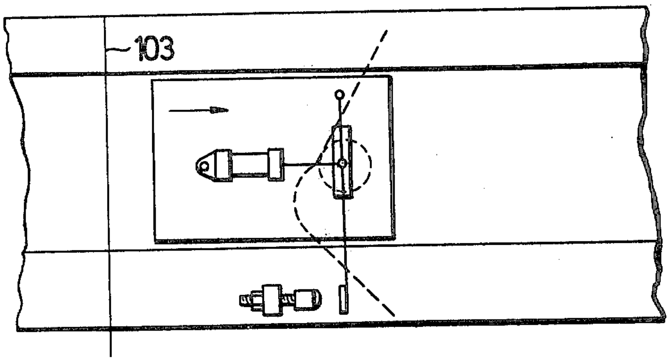
Figure 17:
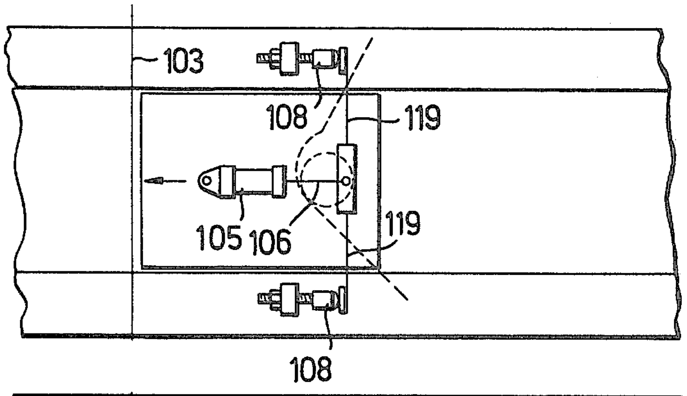
FIGS. 17 to 20 are diagrammatic views of a further embodiment in different phases of operation.
Figure 18:
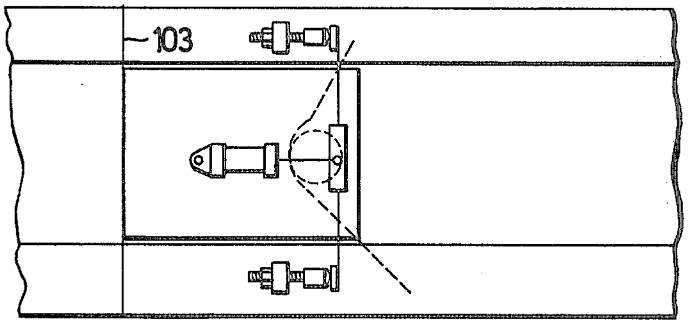
Figure 19:
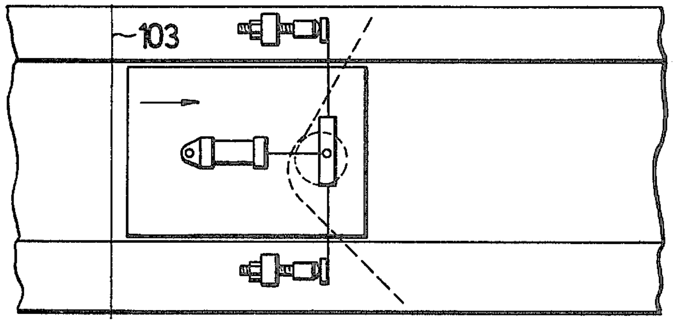
Figure 20:
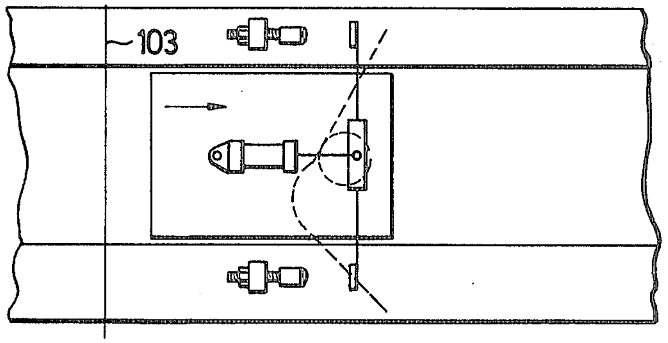
Figure 21:
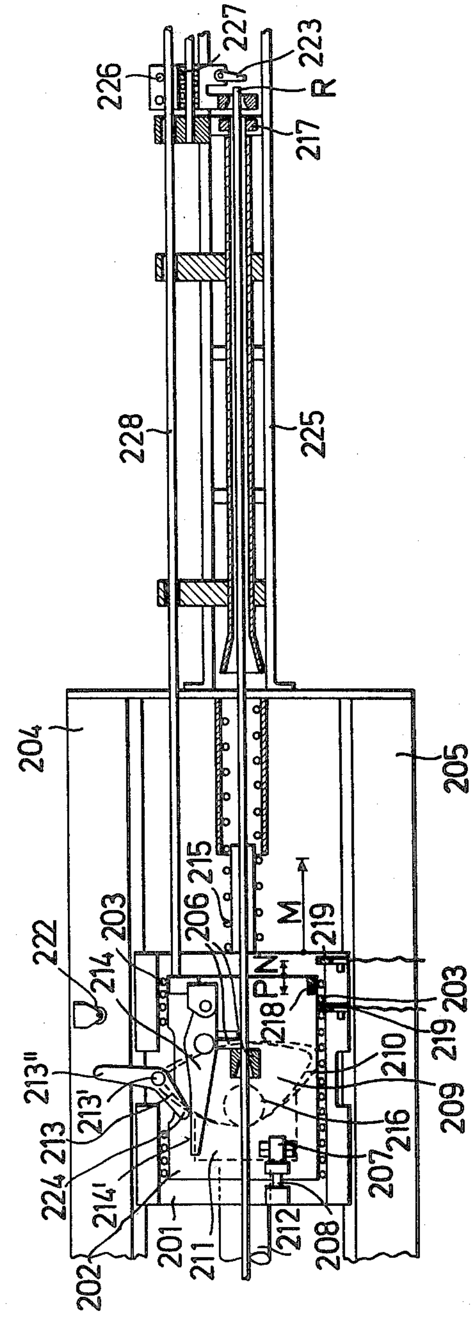
FIG. 21 is a diagrammatic view of a severing device constructed in accordance with the invention and shown in an initial or starting phase of operation.
Figure 22:
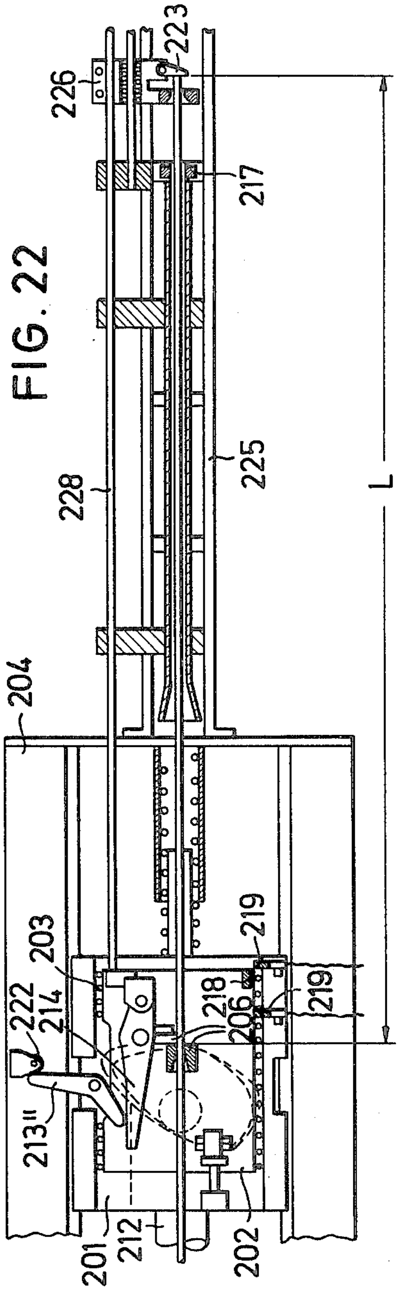
FIG. 22 is a view like that of FIG. 21 of the severing device with the severing location corrected with respect to the starting end of the material.
Figure 23:
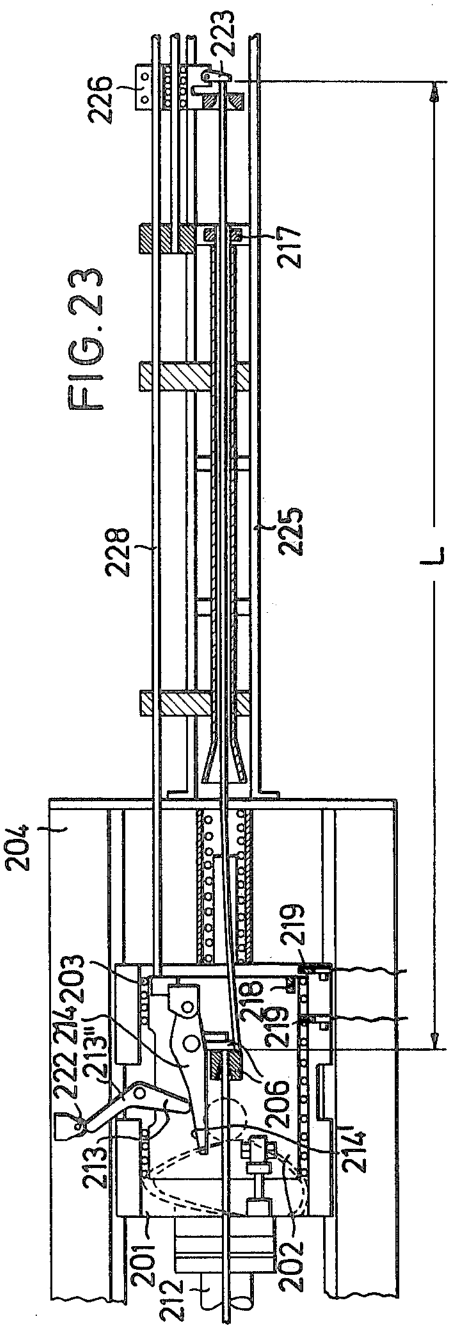
FIG. 23 is a view like FIGS. 21 and 22 of the severing device shown in a phase of operation after the strand of material has been severed.

As shown in FIG. 12, the displacement of the slide 101 continues in direction of the arrow 113. The drawing jaws remain closed through the linkage lever 111, as the spacing 114 is enlarged to the spacing 115.

The basic function of the device shown in FIGS. 13 to 16 is the same as that of the device of FIGS. 9 to 12. However, the FIGS. 13 to 16, cylinder 105 and the piston rod 106 extend in the same direction as the slide tracks. Furthermore, in the embodiment of FIGS. 13 to 16, the piston rod 106 must be drawn inwardly to close the drawing jaws. The blocking lever and the linkage lever of the embodiment of FIG. 13 to 16 are furthermore, identical therein and form a single lever 118. The end stop 108, as in FIGS. 9 to 12, is adjustable in the embodiment of FIGS. 13 to 16. The blocking lever 118 is advantageously of resilient construction which increases the blocking period or range.

In the embodiment of FIGS. 17 to 20, also, the linkage lever and the blocking lever are identical and together form a common lever 119. The lever 119 extends on both sides of and transversely to the slide track direction and cooperates with two end stops 108. In this embodiment, also, the lever 119 may advantageously be of resilient construction so as to increase the blocking period or range.

In the embodiment of FIGS. 21 to 25, a bipartite carriage or severing slide assembly is formed of a lower severing slide 201 and an upper severing slide 202. The lower severing slide 201 is slidably mounted on a track 204, 205 in a machine frame and is movable in travel direction of the material being processed. The upper slide 202 is mounted on the lower slide 201 by means of roller bearings 203 and is movable back and forth relative to the lower slide 201 and parallel to the material travel direction. A severing tool 206 is mounted on the upper slide or carriage 202. Displacement of the upper slide 202 is effected by a displacement member 207, 208 which includes a small, separately driven hydraulic cylinder 207, having a total piston stroke length of about 50 mm. The hydraulic cylinder 207 is secured to the upper slide 202, and its piston rod 208 to the lower slide 201.

The forward and return movement of the lower slide 201 with its upper slide 202 is effected by a drive cam 209, 210 (cam cylinder 209, cam track or profile 210). During one revolution of the cam cylinder 209, the entire severing slide assembly 201, 202 executes one reciprocating movement or one forward-and-return stroke. The course of the cam track or profile 210 is such that, during the rotation of the cam cylinder 209, the forward displacement or the forward velocity of the severing slide during the severing operation is equal to the operating velocity or the material feeding velocity. The cam cylinder or drum 209, during the severing operation, is connected to the main severing shaft 212 in motion-locked or force-locking manner through a controlled coupling (shifting clutch) 211. The main severing shaft 212 is connected through non-illustrated intermediate gearing with a non-illustrated production machine, and the revolution of the main severing shaft 212 always maintain a matched or coordinated relationship with the material feed velocity because of the precision or accuracy of the operation. No special auxiliary control devices or auxiliary controllable drive systems are required for this purpose. Thus, synchronous operation is assured during the severing operation.

Figure 24:
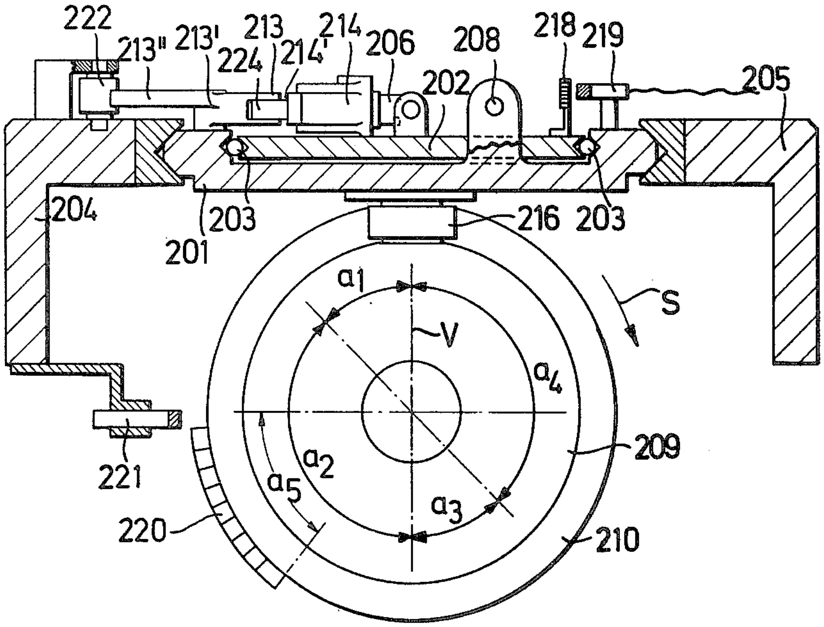
FIG. 24 is an enlarged cross-sectional view of the bi-partite slide of FIGS. 21 to 23.
Figure 25:
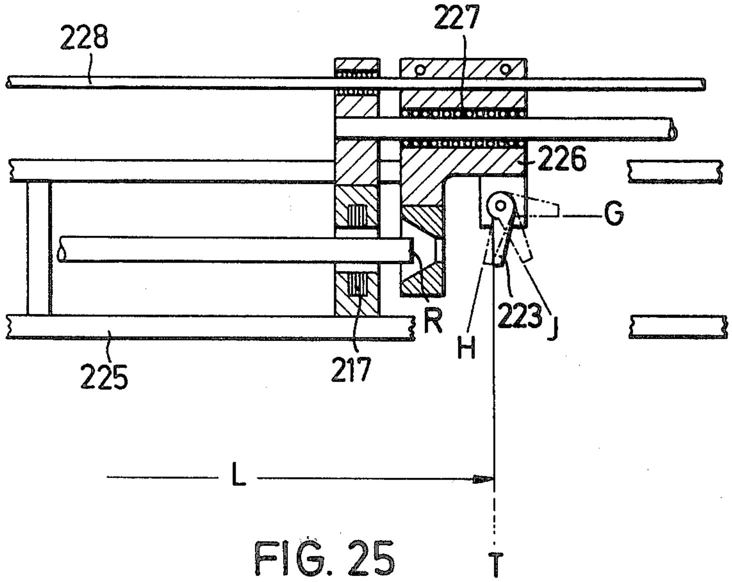
FIG. 25 is a fragmentary enlarged sectional view of the righthand side of FIGS. 21 to 23 showing the release contact and the control finger of the device.

The forward travel in direction of the arrow M (FIG. 21) of the lower slide 201 is composed of the acceleration distance $a_1$, the synchronous distance $a_2$ and the deceleration or slow-down distance $a_3$(FIG. 24). During the travel of the lower carriage 201 along the synchronous stretch $a_2$, exact positioning of the cutting tool 206 or the cutting location relative to the starting end R of the material is performed i.e. adjustment of the length L, as shown for example in FIG. 22. The upper slide 202 is accordingly displaced relative to the lower slide 201 in the direction of the arrow N or P, depending upon a signal transmitted by a control finger 223. The positioning operation is performed in at most 80 ms (milliseconds), so that there is no longer any relative motion between the two slides 201 and 202 before the severing or cutting operation is initiated by the further forward travel of the severing slides 201 and 202.

The severing movement of the severing tool 206 is effected by the forward motion of the entire severing slide assembly 201, 202 through a lever system 213 and 214. The required severing or cutting force is also transmitted by this motion (in direction of the arrow M) of the severing slide assembly 201, 202. The direction of the force is accordingly changed in such a way that a residual force component in the adjustment direction N or P of the upper slide 202 is so small that it can be ignored. The angle lever or bellcrank 213 is pivotally mounted at a pivot point 213′ on the lower slide 201. The arm 213′ of the bell crank 213 strikes against a roller 222 secured to the rail 204, and at the same time the other arm of the bell crank 213 presses against the surface 214′ of the knife-lever 214 through a roller 224. The disposition of the surface 214′ is substantially parallel to the travel direction of the upper slide 202. After the severing operation is completed, the residual distance $a_2$ for the synchronous travel and the deceleration distance $a_3$ are traversed as the forward distance M. The severing slides 201 and 202 reach the rest position at the point V (FIG. 24) through the return distance $a_4$ at increased return speed. By means of a compression spring 215, the lower severing slide 201 is always pressed through a guide roller 216, against the cam track or profile 210 of the cam drum or cylinder 209 and is then returned to the rest position V thereof. Shortly before reaching the rest position at the point V, the cylinder or drum cam 209 is separated from the main separator shaft 212 by releasing the shifting clutch 211 and is held by a non-illustrated holding device, in the starting position V thereof, until a new command initiates the next severing operation.

To set or adjust the severing length L (FIG. 22, for example), a release contact 217 and the control finger 223 are adjusted in accordance with the spacing from the severing location required therefor. The release contact 217 is fastened to the lower frame 225, while the control finger 223 remains readily movable through a ball-bearing guide 227 parallel to the material travel direction represented by the arrow M. The holder 226 of the control finger 223 is supported by a ball-bearing guide 227 and is clamped to a distance rod 228. The distance rod 228 is, in turn, fastened to the upper slide 202. As soon as the upper slide 202 is moved, the distance between the holder 226 of the control finger 223 and the release contact 217 also forcibly changes. If the control finger 223 is disposed perpendicularly to the axis of the material, the nominal severing location is reached, and assurance of an exact length L of the material is thereby given.

In detail, the following timing sequence of the control process for the positioning of the severing location 206 with respect to the starting end R of the material is produced.

The starting end R of the material, when traveling through the release contact 217 (pickup probe ring 217), releases the command to sever, through a conventional speed-dependent time delay. In addition to the speed-dependent time delay, a variable delay is also provided. This auxiliary time delay is adjustable, selectively manually or automatically through an adjusting or servo-motor. Statistical evaluation of test series has shown that normal length tolerances within a given order of magnitude are always present, which must be correlated with an estimated or nominal range. In addition, longer-term deviations, for example, due to temperature effects or influences or wear of the clutch laminations, may necessitate readjustment. This readjustment is effected if the lower limit P or the upper limit N is approached (note FIG. 21). For this purpose, a switching vane 218 is disposed on the upper slide 202 and two contactless pickup probes 219 (note FIGS. 21 and 24) on the lower slide 201. As soon as these range limits are approached, the time delay is suitably changed through the adjusting motor. If the lower limit at P is approached, the time delay is increased, and at the upper limit N, is decreased. Through this additional delay, exact equalization or balancing of length deviations is attained even for an extended period of operation of the machine.

The control device and the command equipment for the servo-positioning are normally not in operation, i.e. when the cylinder cam 209 is in the zero position V. Only after the command for severing is given, is the cylinder or drum cam 209 form-lockingly or positively coupled through the shifting clutch 211 with the main severing shaft 212. The rotary motion of the cam in the direction of the arrow S is thereby initiated. The switching vane 220 secured to the cylinder cam 209 releases or frees the blocked operation of the control device when the vane 220 passes the contactless pickup probe 221. The length of the switching vane 220 or the duration of operation of the control device is such that the acceleration distance $a_1$ and a short part of the synchronous distance $a_2$ are contained therein. The length limit $a_5$ of the switching vane 220 is dimensioned so that the forward travel of the slides 201 and 202 in the direction of the arrow M proceeds so far that the angle lever 213 or bell crank abuts against the roller 222, and the knife or blade 206 has reached the severing position. Within the overlap distance $a_5$ of the switching vane 220, the positioning is performed through conventional regulating and control devices, such as hydraulically, for example. After the switching vane 220 has left the contactless probe 221, the severing operation occurs through the further forward movement of the slides 201 and 202 in the direction of the arrow M. Simultaneously, the control device is blocked. The assumed location or position of the severing point, i.e. the position of the upper slide 202 relative to the lower slide 201, is maintained until the new command is given for the next severing operation.

The control finger 223 for ascertaining the required rod length L actuates a conventional electronic angle transmitter or transducer. The latter delivers a voltage proportional to the angle of rotation, which corresponds to a given control velocity for forward and return control through a servo-amplifier after the control device is set in operation. When the control finger 223 has reached the nominal position T, the positioning or control speed is equal to zero, and the correct position of the severing device 206 has thereby been attained. At the nominal position T, no control voltage is delivered by the rotary transducer or transmitter. After the severing operation has been completed, the control finger 223 is swung outwardly by an electromagnet to the position G shown in phantom which permits unhampered passage of the rod material. Since the servo-operation is blocked, no control voltage is fed to the servo-amplifier either. The control finger 223 is released by the electromagnet to swing back to the normal position H thereof only if the starting end R of the material passes through the ring pickup probe 217 (release contact) and a new switching cycle is triggered.

All of the features that are disclosed in the foregoing description and/or are shown in the drawing should, insofar as the heretofore known state of the art permits, be considered by themselves or in any combinations or partial combinations as being within the scope of the invention, even if not specifically defined in the claims.

We claim:

1. Apparatus for controlling with heightened accuracy a processing machine driven at different operating speeds which, at an initial setting of a moving part thereof, within a tolerance range, repeatedly permits start-up of a processing cycle that has been instituted in advance through a given reaction delay time period, the moving machine part being a working member of the machine, comprising track means for guiding the working member, control means for instituting actuation of the machine part at a position thereof wherein the actuation thereof is institutable, blocking means engageable with the moving machine part for inhibiting full range displacement of the machine part that would otherwise result from the institution of the actuation thereof, said blocking means being active for inhibiting the full range displacement along a section of said track means up to a given position of the moving machine part within the displacement range thereof, said blocking means comprising an end stop associated with said track means, and a locking lever associated with the moving machine part and movable in direction of said track means, said locking lever being held by said end stop in a position blocking full range displacement of the moving machine part.

2. Apparatus according to claim 1 including a pressure medium-responsive member serving to actuate the moving machine part and comprising a cylinder, a piston displaceable in said cylinder and having a piston rod at the moving machine part, said locking lever being mechanically connected by an articulating joint with said piston rod and, in said blocking position, permits at most only a partial stroke without full range displacement of said pressure medium-responsive member.

3. Apparatus according to claim 1 wherein said pressure medium-responsive member is operable in direction of said track means, said locking lever is articulatingly connected to the moving machine part and extends transversely to the direction of said track means to within effective range of said end stop, and the free end of said piston rod is articulatingly connected to said locking lever.

4. Apparatus according to claim 3 wherein said locking lever extends on both sides from the movable machine part in direction transverse to that of said track means, and including two end stops associated with said track means and cooperating with the two ends, respectively, of said locking lever.

5. Apparatus according to claim 1 wherein said locking lever is yieldably resilient so as to extend the blocking range thereof.

6. Apparatus according to claim 2 including deflection means comprising a toggle lever linkage having a first toggle lever pivotally secured at an outer end thereof to a fixed bearing location on said slide and a second toggle lever having an outer end force-lockingly connected through an articulating joint with linkage means connected to said slide, said first and second toggle levers having a common toggle joint, said pressure medium-responsive member being operable in direction transverse to said track means, said piston rod being articulatingly connected to said common toggle joint, said first toggle lever being constructed as a bellcrank and having a free arm forming said locking lever.

7. Apparatus according to claim 6 wherein said locking lever is formed as a cam on said first toggle lever and has a surface displaceable in direction of said track means to cooperate with said end stop.

8. Apparatus according to claim 6 wherein said said second toggle lever is adjustable in length.

9. Apparatus according to claim 1 wherein said end stop is adjustable in position.

10. Continuously operating processing machine for processing strand-shaped material traveling in longitudinal direction of the material through the machine including members acting on the material in a direction transverse to the longitudinal travel direction thereof and devices for controlling respective operating speed with heightened accuracy, comprising a severing device adapted to travel along with the traveling material for a predetermined distance and actuable to sever given lengths of the material, said severing device comprising a lower and an upper severing slide, track means, said lower severing slide being guidable on said track means parallel to the operating direction of the machine, said upper severing slide guidable on said lower severing slide parallel to the operating direction, a severing tool carried by said upper severing slide, a main severing shaft continuously running in synchronism with a main operating shaft of the processing machine, controlled clutch means, drive cam means for displacing said lower severing slide back and forth, the displacement of said lower severing slide in the forth direction being in synchronism with the operating drive of the material, said main severing shaft being motion-lockingly couplable through said controlled clutch means with said drive cam means as said severing device travels along with the traveling material, and controlled positioning means for positioning said upper severing slide with respect to a starting end of the material prior to the severing operation.

11. Severing device according to claim 10 wherein said positioning means comprise a controllable displacement member having one end thereof secured to said upper severing slide and another end thereof secured to said lower severing slide.

12. Severing device according to claim 11 wherein said controllable displacement member comprises a pressure medium-responsive cylinder, a piston displaceable in said cylinder and having a piston rod.

13. Severing device according to claim 10 comprising a distance rod secured to said upper severing slide and extending parallel to operating travel direction of the material, control finger means mounted on said distance rod and serving to control said displacement member, said control finger means being adjustable in accordance with a predetermined length of the material to be severed, and means for actuating said control finger means from the starting end of the material.

14. Severing device according to claim 10 including a lower frame, a release contact adjustably secured to said lower frame and located ahead of said control finger means in traveling direction of the material, said release contact being actuable by the starting end of the material for effecting controlled, time-delayed engagement of said clutch means between said main severing shaft and said drive cam means.

15. Severing device according to claim 10 wherein said severing tool is a cut-off knife blade, and comprising a first level holding said knife blade and pivotally mounted on said upper severing slide, said first lever extending substantially parallel to operating travel direction of the material, a second lever in the form of a bellcrank pivotally mounted on said lower severing slide and cooperating with said first lever, said second lever having at one arm thereof roller means for transmitting severing force to said first lever substantially transversely to the operating travel direction, and with said other arm thereof projecting into the vicinity of said track means for guiding said lower severing slide so as to produce the severing force when moving past a contact roller carried by said track means.

* * * * *